United States Patent [19]

Foerster

[11] 3,869,281
[45] Mar. 4, 1975

[54] REMOVAL OF NICKEL FROM MOLTEN MAGNESIUM METAL

[75] Inventor: George S. Foerster, Monmouth Jct., N.J.

[73] Assignee: N L Industries, Inc., New York, N.Y.

[22] Filed: Feb. 14, 1974

[21] Appl. No.: 442,367

[52] U.S. Cl. .................................... 75/67, 75/63
[51] Int. Cl. .................................... C22b 45/00
[58] Field of Search ............ 75/67 R, 67 A, 63, 177

[56] References Cited
FOREIGN PATENTS OR APPLICATIONS
1,353,011  1/1964  France .................................... 75/67

Primary Examiner—C. Lovell
Assistant Examiner—M. J. Andrews

[57] ABSTRACT

Nickel as an impurity in magnesium metal may be substantially removed from molten magnesium metal by adding zirconium and aluminum metal to the magnesium metal to form an insoluble phase containing the nickel impurity. Apparently the nickel forms a ternary phase Zr-Al-Ni which is insoluble in the molten magnesium metal.

2 Claims, No Drawings

REMOVAL OF NICKEL FROM MOLTEN MAGNESIUM METAL

BACKGROUND OF THE INVENTION

Nickel when present in magnesium metal or magnesium alloys markedly decreases the corrosion resistance of magnesium metal. The removal of the nickel content from the magnesium metal normally is difficult. The prior art teaches two methods for removing the nickel but both methods are impractical from an economic standpoint. One method is to dilute the nickel contaminated magnesium metal with substantially pure magnesium metal until the nickel content is reduced to an innocuous level. The other method is to remove the nickel from the magnesium metal by distilling the magnesium metal from the nickel. Both methods are far too expensive to employ in a commercial operation.

SUMMARY OF THE INVENTION

Nickel present as an impurity in molten magnesium metal may be removed by adding zirconium and aluminum metal to form an insoluble phase containing the nickel impurity. This insoluble product apparently is a ternary phase Zr-Al-Ni which is removed from the purified metal by settling. Using this process the nickel content in the magnesium metal may be reduced from an amount as high as about 0.2% to produce a purified magnesium metal containing an amount of nickel as low as 0.001%.

If the nickel content in the magnesium metal is greater than about 0.2%, the addition of zirconium alone to the magnesium metal forms a binary phase (Zr-Ni) with the zirconium which is precipitated from the magnesium metal. Amounts of nickel up to about 2.0% may be reduced to about 0.2% by adding zirconium alone.

As previously stated, the nickel may be reduced from about 0.2% to as low as 0.001% by adding zirconium and aluminum to the magnesium metal to form the insoluble ternary system Zr-Al-Ni.

DESCRIPTION OF THE PREFERRED EMBODIEMENTS

When the nickel content of the magnesium metal is present in amounts up to 0.2%, the amount of zirconium metal employed preferrably should be from 0.1 to 3.0% and the aluminum metal should be added in amounts from 0.1 to 2.0%.

It is preferable to add zirconium and aluminum in amounts of about 1 to 30 times the nickel content for zirconium and about 1 to 20 times the nickel content for aluminum. If the nickel content is above 0.2%, the zirconium should be added in amounts from 1 to 10 times the nickel content to form the binary phase. Amounts of aluminum that are larger than amounts necessary to reduce the nickel content may also be added if it is desired to form Mg-Al alloys.

It has been found that the zirconium metal is conveniently added as an alloy of zirconium and magnesium in which the zirconium content is about 30 to 50%.

In carrying out the process of the instant invention, if the contaminated magnesium metal contains less than about 0.2% nickel, the magnesium metal is melted and to the melt are added the amounts of zirconium metal and aluminum metal specified above to form a ternary phase Zr-Al-Ni with the nickel metal present. The ternary phase is insoluble in the melt and most of the ternary phase settles to the bottom of the vessel. Since not all the ternary phase containing nickel settles out of the magnesium metal, the total nickel content of the magnesium metal is greater than the nickel content which is actually dissolved in the magnesium. It has been found that the corrosion resistance of magnesium metal of the instant invention at a given nickel level is superior to the corrosion resistance of untreated magnesium metal at the same nickel level.

It has also been found that other elements, such as iron and the like, which adversely effect the corrosion resistance are also removed by this process.

The purified magnesium metal, low in nickel, is then decanted from the insoluble residue.

In order to describe the instant invention more fully, the following examples are presented:

EXAMPLE 1

A 100 pound melt of magnesium metal containing 0.05% nickel was heated to 1,400°F. The melt was then treated with 1% zirconium metal by adding 2 pounds of a magnesium-zirconium alloy containing 50% by weight zirconium. The melt was then thoroughly stirred. Next, 0.5% aluminum metal was added, and the melt was stirred again for two minutes. After the stirring was complete, the melt was allowed to settle for 15 minutes. By means of a vacuum gun, samples of the purified magnesium metal was then taken and analyzed.

The purified metal contained 0.002% nickel and 0.3% Al. In addition the iron content was reduced from 0.013% to 0.001% Fe. When samples of the melt were tested by complete immersion in a 3% NaCl solution for three days, they were found to have a corrosion rate of 0.14 ipy (inches per year). This compares with a corrosion rate of 9.8 ipy for the Mg metal containing 0.05% Ni prior to treatment (recorded as the control).

The operational details and the results obtained are recorded in the following table.

EXAMPLES 2 – 9

In these examples, the procedure of Example 1 was repeated except that various quantities of zirconium and aluminum metal were added to the molten magnesium to remove the nickel metal dissolved in the magnesium metal.

The operational details and the results obtained are recorded in the following table.

From the above description and by the examples presented, it has clearly been shown that the nickel content in a magnesium alloy may be reduced to innocuous amounts in regard to corrosion resistance. Apparently adding zirconium and aluminum to the magnesium metal produces a ternary phase which is insoluble in the magnesium metal.

While this invention has been described and illustrated by the examples shown, it is not intended to be strictly limited thereto, and other variations and modifications may be employed within the scope of the following claims.

TABLE

| Molten | EXAMPLE NUMBER | | | | | | | | | |
|---|---|---|---|---|---|---|---|---|---|---|
| | 1 | 2 | 3 | 4 | 5 | 6 | 7 | 8 | 9 | CONTROL |
| Molten Magnesium Metal Melt (lb) | 100 | 100 | 100 | 100 | 100 | 100 | 100 | 100 | 100 | 100 |
| Amount of Nickel (%) | .05 | .05 | .05 | .05 | .05 | .05 | .05 | .05 | .05 | .05 |
| Amount of Zirconium Added (%) | 1.0 | 1.0 | 1.0 | 1.0 | 1.0 | .5 | .5 | .5 | .25 | — |
| Amount of Aluminum Added (%) | .5 | 1.0 | .4 | .3 | .2 | 1.0 | .3 | .2 | 1.0 | — |
| Amount of Aluminum Retained (%) | .3 | .60 | .23 | .17 | .12 | .82 | .15 | .07 | .94 | — |
| Amount of Nickel Retained (%) | .002 | .003 | .003 | .005 | .012 | .006 | .006 | .016 | .018 | .05 |
| Corrosion Resistance (IPY) | .14 | .39 | .23 | .51 | 1.44 | .46 | .88 | .72 | 1.12 | 9.8 |

I claim:

1. A process for removing nickel metal from magnesium metal, in which the nickel content is present in amount up to about 0.2%, which comprises adding zirconium metal and aluminum metal to said magnesium metal to form a ternary phase Zr-Al-Ni which is insoluble in said magnesium metal, and separating the ternary phase from the resultant purified magnesium metal.

2. Process according to claim 1 in which the amount of zirconium metal added is from 1 to 30 times the amount of nickel present in the magnesium metal and the amount of aluminum metal added is from 1 to 20 times the amount of nickel present.

* * * * *